United States Patent Office 3,526,829
Patented Sept. 1, 1970

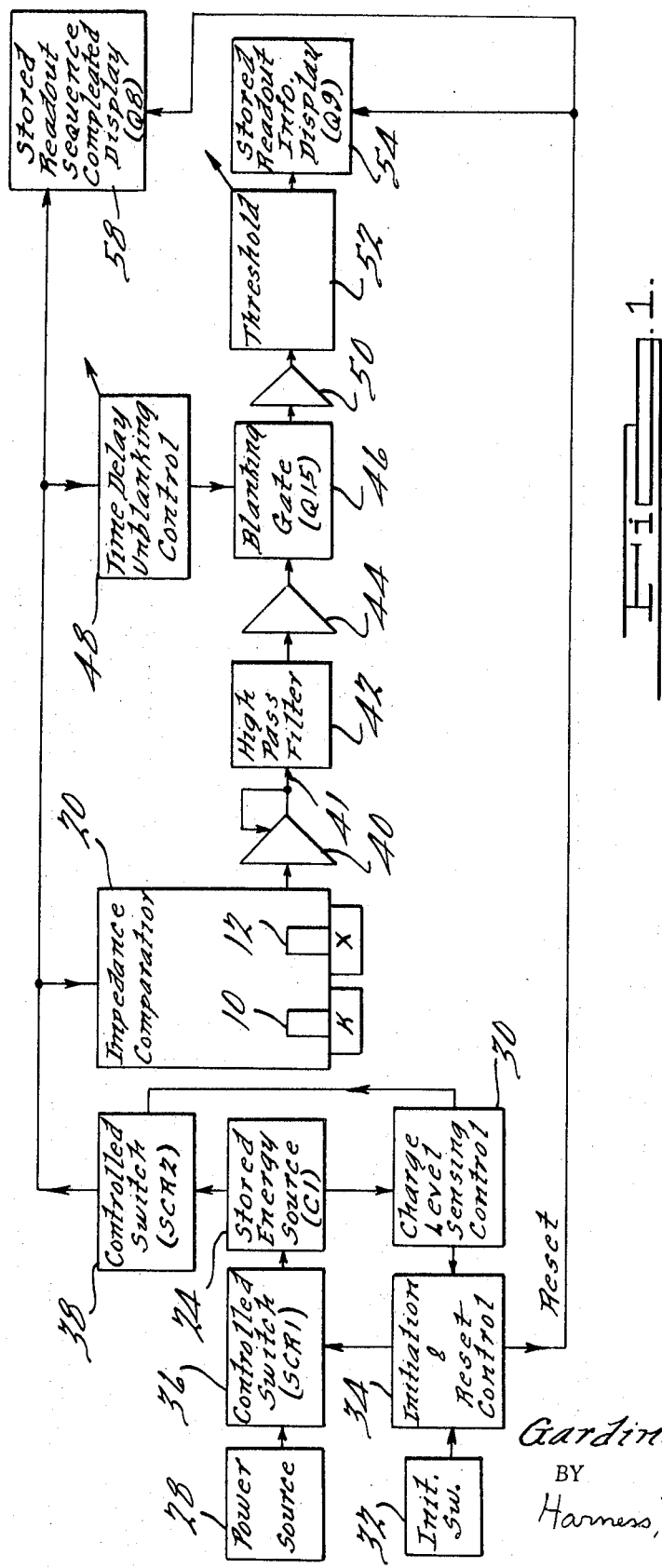

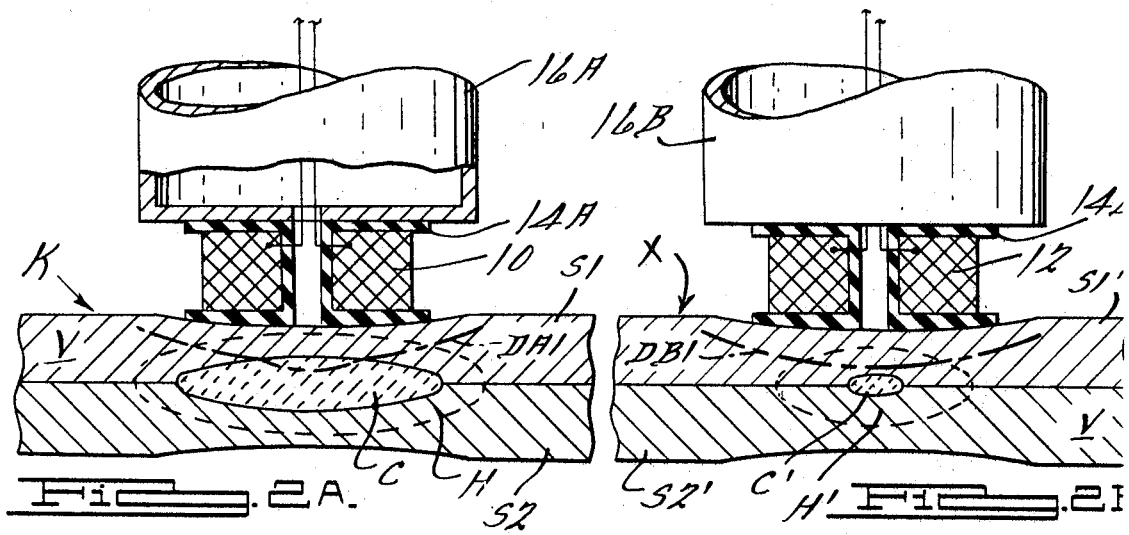
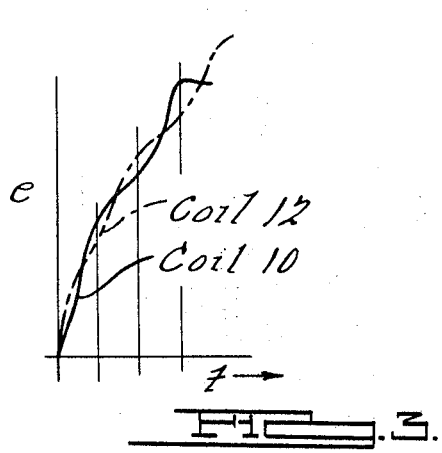
FIG.3.
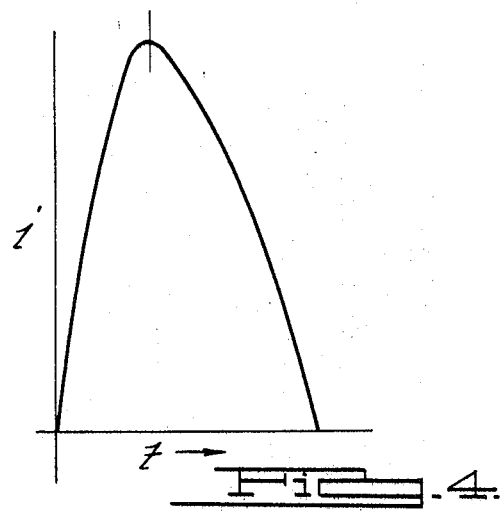
FIG.4.
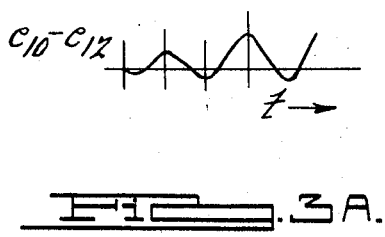
FIG.3A.
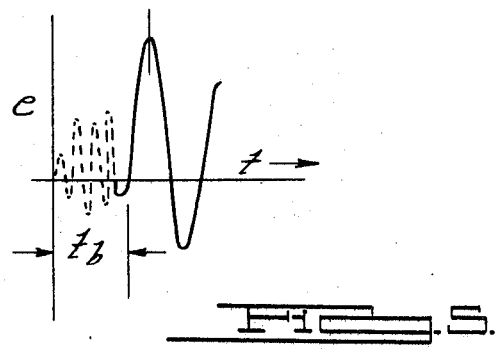
FIG.5.
INVENTOR.
Gardiner A. Noble
BY
Harness, Dickey and Baldwin
ATTORNEYS

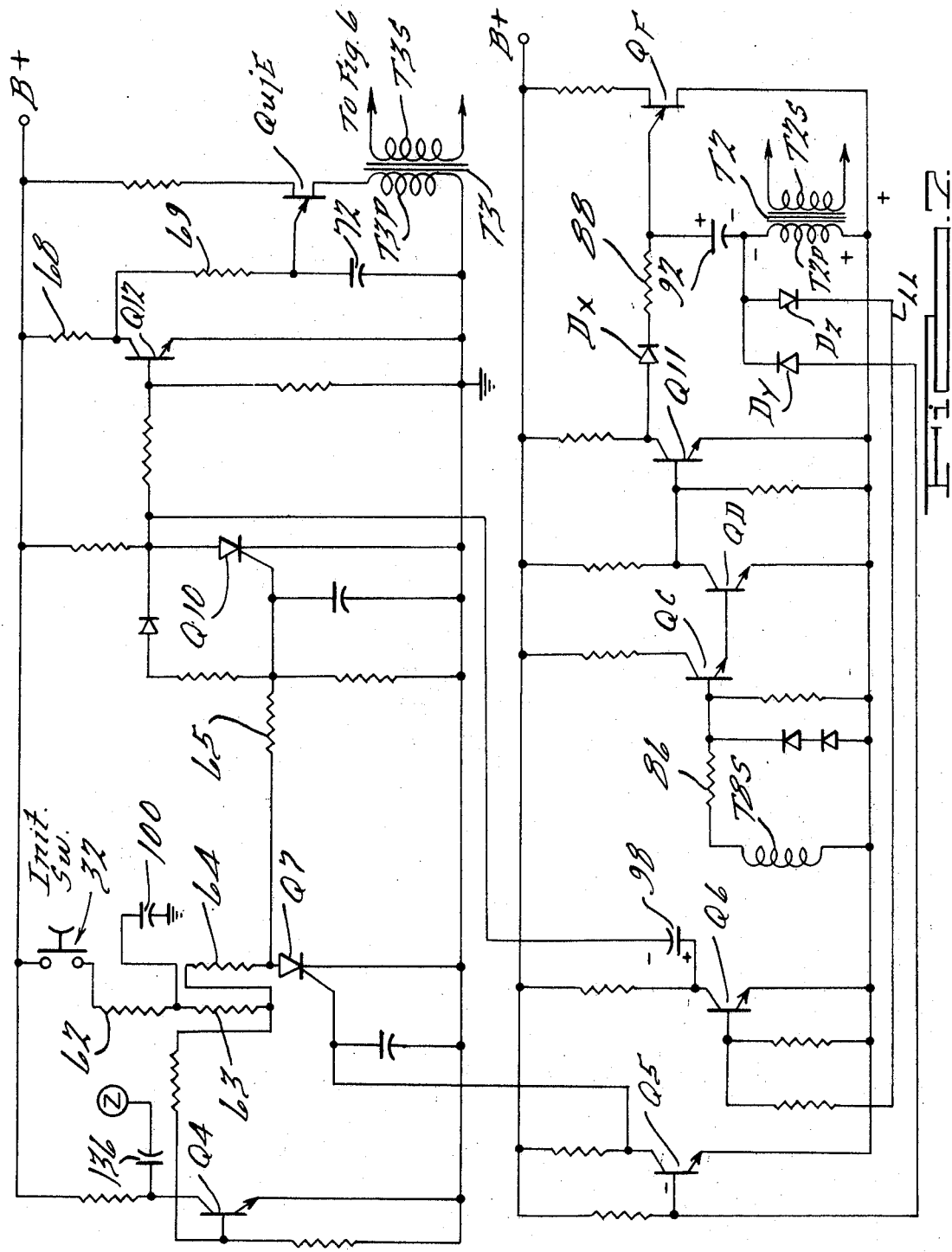

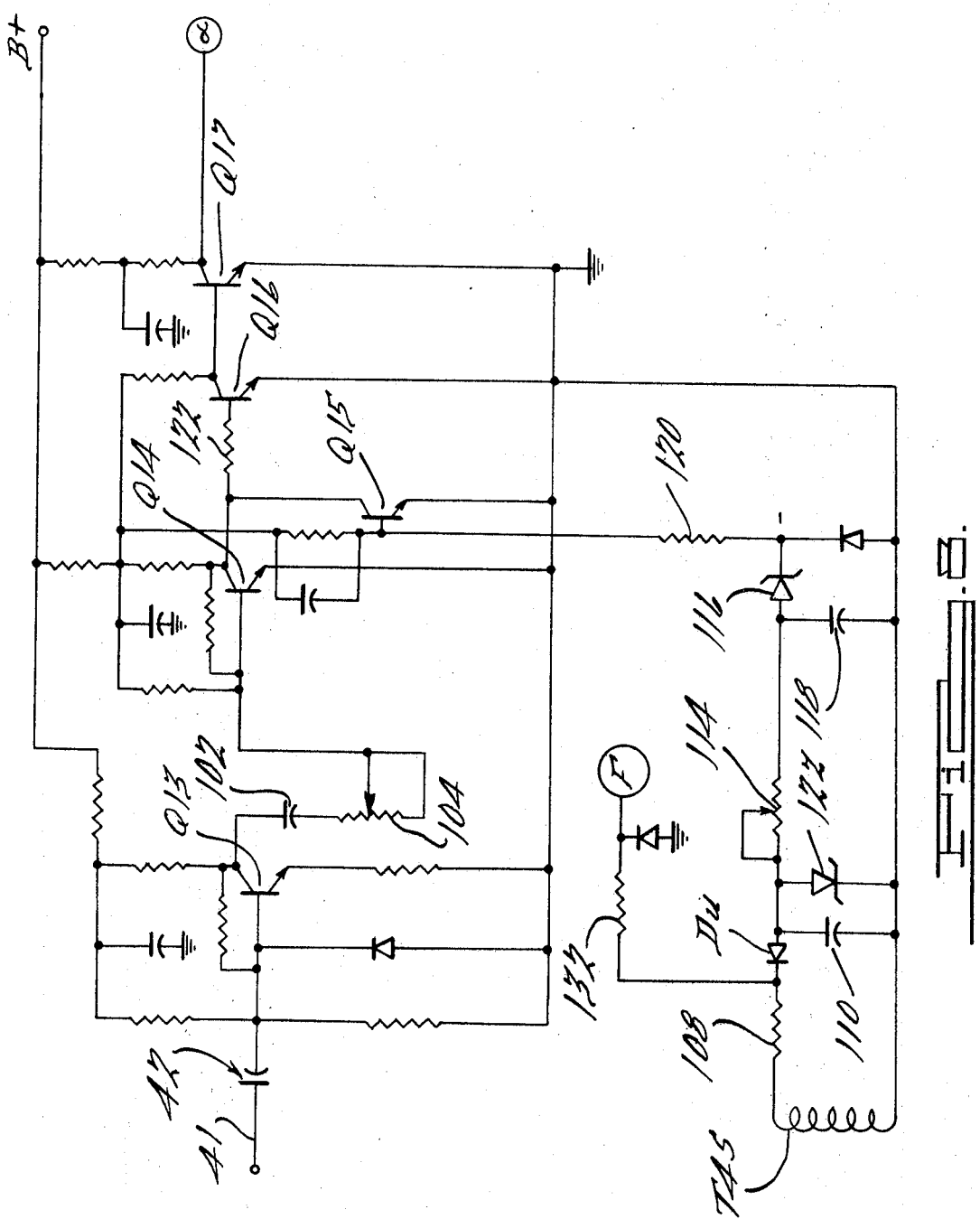

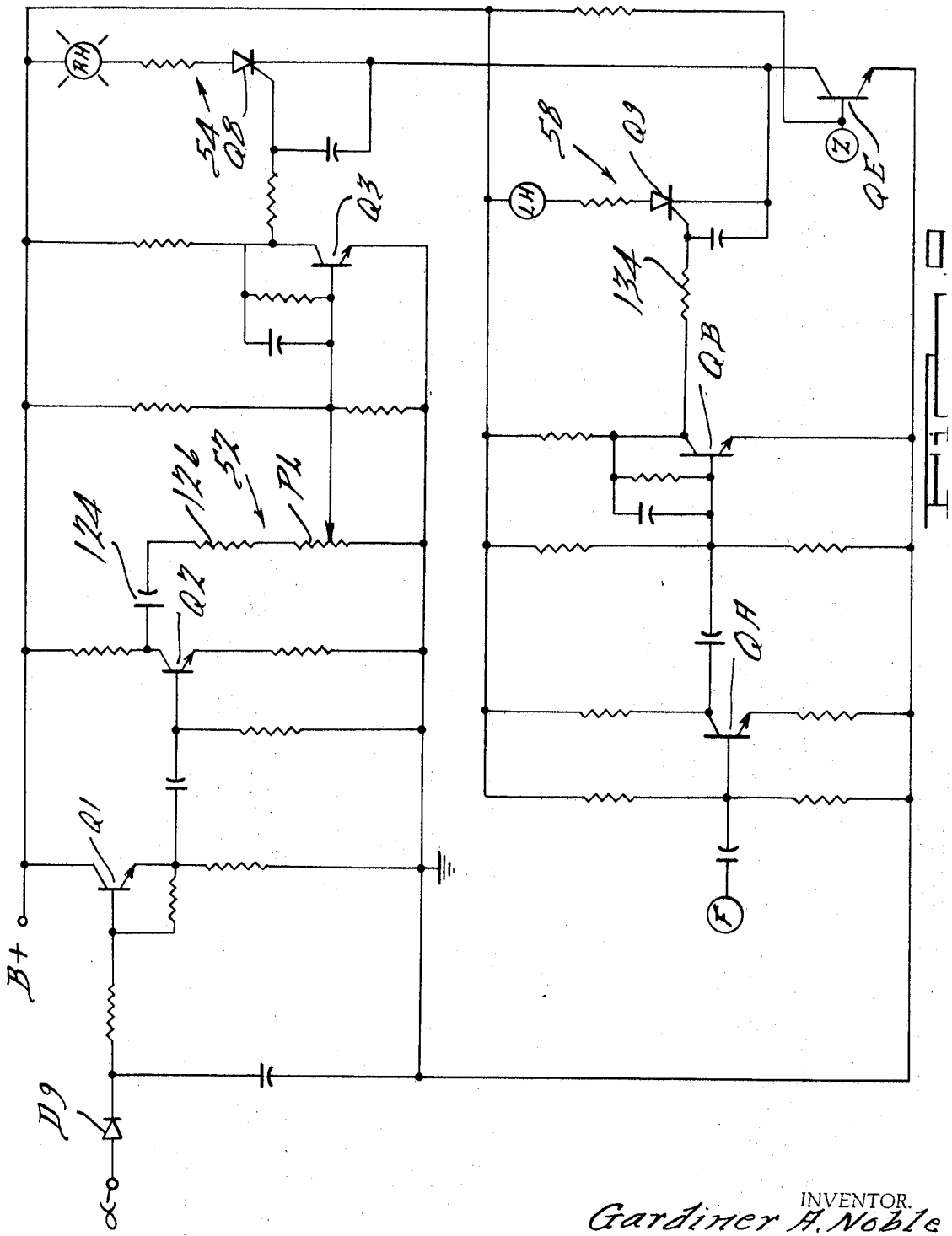

3,526,829
PULSED EDDY CURRENT APPARATUS FOR NON-DESTRUCTIVE TESTING OF RESISTANCE TYPE WELDS
Gardiner A. Noble, Farmington, Mich., assignor to Chrysler Corporation, Highland Park, Mich., a corporation of Delaware
Filed Apr. 24, 1968, Ser. No. 723,708
Int. Cl. G01r *33/12*
U.S. Cl. 324—40  11 Claims

ABSTRACT OF THE DISCLOSURE

A method of and apparatus for non-destructive testing of resistance spot welds in ferro-magnetic materials by comparison of the depth of penetration of a pair of eddy current inducing, pulsed high intensity electromagnetic fields, which are locally applied to the test weld and to a reference weld, as manifested by dynamic impedance measurements of the effect of the induced eddy currents on their applied fields. An information signal varying in accordance with any difference between the measured dynamic impedance effects is applied to a time-blanked, adjustable threshold signal utilization circuit having a memory storage read out acceptance-rejection form of display.

BACKGROUND OF THE INVENTION

Field of the invention

This invention relates to the field of weld testing and to a method of and apparatus for non-destructive evaluating of the strength and quality of resistance type welds.

Prior art

The still prevailing practice in evaluating the strength and quality of resistance welds is to resort to destructive type testing procedures. While yielding information for regulation of the welding process and operating conditions, such testing procedures are obviously inapplicable to finished articles employing the weld without destruction of the article. Non-destructive tests as have been heretofore proposed, as radio-graphic examination by X-rays, are primarily adapted to void and crack detection and, like ultra-sonic techniques, are incapable of satisfactory evaluation of resistance type welds based upon weld content or the relative amount of fused or cast material and the extent of the heat affected area of such welds.

Accordingly, the present invention has for its object to provide an apparatus for evaluating the strength and quality of resistance type welds without destruction of the articles employing the welds.

Another object is to provide apparatus of the aforementioned character that is specially suited to evaluation welds and ascertaining the relative strength and quality of the weld as affected by the relative amount of cast or fused structure in the weld.

Another object is to provide apparatus of the aforementioned character that is specially suited to evaluation of resistance type spot welds formed in ferromagnetic materials.

Another object is to provide a weld analyzer apparatus having an information signal handling and utilization circuit of high noise and undesired signal rejection capability and providing a stored readout form of information display therefrom.

DESCRIPTION OF THE DRAWINGS

FIG. 1 is a single line flow and block diagrammatic representation of the general functional organization of the apparatus of the present invention;

FIGS. 2A and 2B illustrate the manner of application of the penetration fields to a reference comparison weldment and a test weldment in accordance with principles employed in the present invention;

FIGS. 3, 3A, 4 and 5 are wave forms on different time bases to which reference is made in explaining the principles and operation of the invention; and FIGS. 6 through 9 represent the schematic electric circuit diagram of the apparatus of the invention.

DESCRIPTION OF THE PREFERRED EMBODIMENTS

Figure 6:
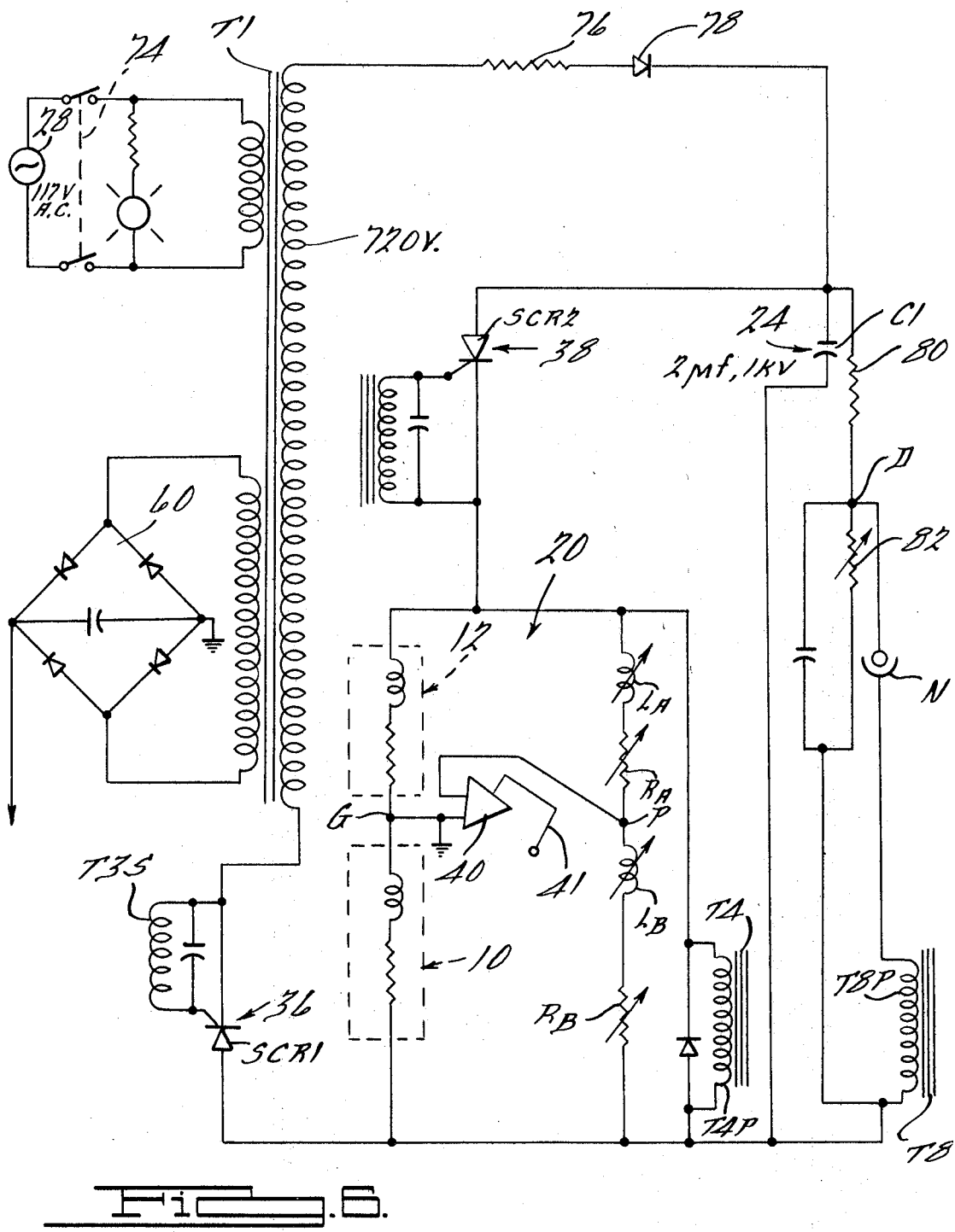

Referring to the drawings, FIGS. 2A and 2B illustrate a pair of resistance spot welds as are formed at the faying or united region between the interface or the facing surfaces of a pair of sheets S1 and S2 of material, as sheet steel for example. Each of the welds is characterized by a "nugget" or cast region C, which is formed of fused material from both sheets and is surrounded by a heat affected area H, whose electrical and magnetic properties differ significantly from both the parent material V of the sheets and from the cast region of the weld.

For purposes of discussion, it will be assumed that the weld of FIG. 2A contains a sufficient amount and distribution of cast material at the faying or united region in respect to the thickness of the sheets to constitute a weld of acceptable strength and quality. In accordance with standards established for welds of this character, the longitudinal extent of the cast material of the weld is approximately five times the thickness of the thinnest one of the sheets of the weldment. The weld of FIG. 2B is characterized by a lesser extent and a limited amount of fused material C' in the united area of the sheets than the weld of FIG. 2A and expectedly would be of inferior strength and quality.

As practiced herein, such welds are evaluated on a non-destructive basis by locally applying a pulsed electromagnetic field of such intensity as to penetrate below the surface of the top sheet and down into the cast material where the information concerning the character of the weld is contained. The penetrating field induces Foucalt or eddy currents, the electrical parameters of which are affected by the electrical and magnetic characteristics of the material at the level at which the currents are induced to flow in the weld material. In accordance with the general principle of Lenz's law, the eddy currents in turn react back upon the field which produces the current. The reaction is sensed by monitoring the impedance change in the field generator and is compared against the impedance change produced by the simultaneous application to the reference weld of a similar field which is produced from the same current as that producing the field applied to the weld being tested.

The fields are generated or produced by probe coils 10, 12 in the form of miniature air core solenoids, which are of small physical dimension in order to localize or concentrate the field in the immediate area of the weld. In relation to the standard or comparison weld of FIG. 2A, for example, the diametrical expanse of the probe coil is less than longitudinal extent of the cast structure contained therein.

The coils are of identical construction and electrical and magnetic characteristics, each composed of, say, from 30 to 40 turns of #32 gauge copper wire wound on an insulating bobbin, as 14A and 14B, and exhibiting a resistance of 0.45 ohm and an inductance of 8 microhenries for example. Each bobbin is mounted on an insulating probe handle, as 16A and 16B, and has a frontal surface conforming to the shape and contour of the surface of the weldment against which the probe coil is placed in intimate surface contacting relation. The coils, further, are devoid of any ferro-magnetic material in the core structure thereof, the variations in the permeability of which would tend to mask the reaction of the eddy currents on the fields of the coils.

The energizing current applied to the coils is of sufficient intensity to produce a magnetic field that will penetrate below the skin or surface of the sheets comprising the weldment. As applied to resistance welds formed in ferro-magnetic materials, the applied field is of sufficient intensity to magnetically saturate the material below the coil in order to reduce or lower the permeability of the medium to essentially that of air, thereby to force the field to penetrate deep into the material of the weldment and induce eddy currents to flow at the level of the fused or cast material therein.

In this respect the evaluation technique may be considered as one of comparing the relative depths of penetration of the electro-magnetic fields into the materials of the reference and the test welds. If the electrical and magnetic properties of the welds are the same, as where each weld is of the same consistency and contains the same amount of cast material and heat surrounding area, the depth and rate of penetration at any period of time of the respective fields will be similar. Conversely, differences in the welds will be manifested by different depths of penetration as represented in FIGS. 2A and 2B, where the wave penetration front labelled DA1 has attained a greater depth of penetration in the reference weld than the wave front DB1 in the test weld at the end of any given period of time, $t1$.

The difference in the depths or rates of penetration, as reflected upon the fields of the coils, affects the resulting impedances of the respective coils, as indicated by the curves of FIG. 3, representing the instantaneous voltages across the coils 10 and 12 subjected to the same energizing current flow therethrough. The difference in the voltages can be detected by differencing null detection or balancing techniques to derive an information signal represented in FIG. 3A, whose instantaneous amplitude represents, on a comparative basis, the deviation of the properties of the test weld from those of the reference weld at different penetration levels of the applied fields.

The structural mechanization of the apparatus of the present invention is depicted by the schematic electrical circuits represented in FIGS. 6–9, the functional organization of which will first be explained with reference to the single line flow and block diagrammatic representation of FIG. 1 in which the probe coils are shown at 10, 12. The probe coils are included in the impedance comparator 20 and are shown located in position over the reference comparison weld, labelled K, and the test weld, labelled X, whose electrical and magnetic characteristics are to be compared against those of the reference weld based on the principles of the measuring techniques decribed above. The coils are energized from a stored energy source 24, which in the circuit embodiment of FIGS. 6–9, is a storage capacitor C1. The capacitor is charged from rectified current derived from a power source 28 and is subsequently discharged after the capacitor has attained a predetermined voltage thereon as sensed by a charge level sensing control, indicated at 30.

Initiation of the operation of the system is effected from a manually operable initiation switch 32, which is associated with an initiation and reset control section 34. The latter section connects the capacitor to be charged from the power source 28 through a controlled switch 36 constituting a semi-conductor controlled rectifier SCR device, labelled SCR1 in FIG. 6, and also supplies a reset signal at the beginning of the operating or test sequence to reset the stored readout display sections of the measuring apparatus.

The charge level sensing control 30 continuously monitors and senses the level of the charge voltage on the capacitor. The control automatically connects the capacitor through another controlled switch 38, labelled SCR2 in FIG. 6 to discharge through the probe coils and also causes the reset control to disable the controlled switch SCR1 to disconnect the charging of the capacitor from the power source 28.

The capacitor discharges a high intensity current pulse, typified by the curve of FIG. 4, attaining a peak of several hundred amperes over a short period of time of about 15 microseconds through the probe coils 10 and 12, which are effectively connected in series in the impedance comparator. As distinguished from equal voltages that would appear across the coils if they were situated in air or over a homogenous medium, the voltages across the coils in the case of the ferro-magnetic weldments of FIGS. 2A and 2B vary somewhat in the manner of FIG. 3, for example, in which the waveforms may be considered as having superimposed thereon a component of variation representative of the variations in the heterogenous properties of the material and the electrical and magnetic characteristics of the welds. The difference between the instantaneous voltages across the respective coils is detected by the impedance comparator shown as a bridge in FIG. 6.

The output of the bridge is supplied through a high impedance operational amplifier 40 to a high pass filter 42, which passes signals of the frequency of the detected signals of FIG. 3A, and attenuates noise and other signals of a frequency of the carrier or pulse frequency. The signals passed by the filter correspond to the variations in the difference of the instantaneous voltages across the respective coils. The output of the filter is supplied through amplifier 44 to a blanking gate 46 in the form of a control switch represented by a transistor Q15 in FIG. 8 which blocks or prevents transmission of the information signal until the expiration of a predetermined delay period. The switch is disabled or controlled from a time delay or unblocking control circuit 48 that is initiated or starts timing out with the initiation of the capacitor discharge.

The blanking gate effectively removes the initial portion of the information signal shown in FIG. 5. This portion of the signal is generated by and is characteristic of the varying surface conditions of the workpiece and during the presaturation interval of the surface of the weldments before the applied fields have penetrated into the weld where the information concerning the character of the welds is contained. In the absence of the blanking gate and its associated control, the initial portion of the information signal could activate the apparatus and produce erroneous readout therefrom.

The output of the gate 46 is applied through amplifier 50 to a threshold level device 52, which is adjustable to set the margin of acceptance or rejection of the quality of the test weld. If the level of the subsequent or unblanked portion of the detected information signal is above the threshold level, manifesting a deviation of the test weld from the comparison weld that is greater than the acceptable quality control levels, the output of the threshold device is of sufficient magnitude to activate a stored readout information display 54 in the form of a signal indicating lamp indicated at RH in FIG. 9.

Another stored readout display, which includes a second different colored indicating lamp LH is also provided and is activated upon the initiation of the discharge of the capacitor and signifying that the charging initiation, charge attainment level and the subsequent discharge of the capacitor has occurred. The information readout display 54 and the sequence completion readout display 56 are of the memory storage variety effected from current controlling devices shown as conduction latching SCR devices labelled Q8 and Q9 in FIG. 9, which are latched into conduction to retain the activated conditions thereof after completion and the expiration of the information signal. The information display is retained until reset upon the initiation of a subsequent measurement or test cycle when a reset signal is supplied from the initiation and reset control 34 to turn off the signal display lamps by interruption of the current through the SCR or current controlling devices.

Referring now to the actual circuit schematic of the measuring apparatus of the present invention, the initiation control circuit 34 is shown in FIG. 7 in which the initiation switch is shown at 32. B plus voltage, which is derived from bridge rectifier 60 in FIG. 6, is applied upon actuation of the switch 32 through a series circuit which includes resistors 62, 63, 64 and 65 to the gate of a semi-conductor controlled rectifier (SCR) device, labelled Q10. Q10 is thus turned on and turns off normally conducting NPN switch transistor Q12, whose base is connected to the anode of Q10. Current can then flow from B plus through resistors 68, 69 to charge capacitor 72, whose positive side is connected to the base of uni-junction $Q_{uj}E$. Upon charging of the capacitor 72, uni-junction $Q_{uj}E$ is turned on as a free running oscillator and supplies oscillation through the primary T3P of pulse transformer T3 whose secondary winding is connected across the gate and cathode elements of SCR1 in FIG. 6 to fire SCR1.

SCR1 is connected in circuit completing relation with the 720 volt high voltage secondary winding of power transformer T1, whose primary side is connected through a manually operable power turn on switch 74 to the power source of supply symbolically represented at 28. A half wave rectifying circuit is thus completed through SCR1, the secondary of transformer T1, limiting resistor 76 and rectifier element 78 to supply half wave rectified current pulses to charge the energy storage capacitor C1, shown as a 2 microfarad, 1000 v. capacitor at 24.

Connected across the capacitor is a voltage divider composed of resistor 80 and adjustable potentiometer 82, the latter having a serially connected neon bulb N and the primary winding T8P of a pulse transformer T8 connected thereacross. The bulb is excited when the voltage at the junction point D of the divider network has attained a predetermined level related to the setting of the potentiometer and the voltage level attained by the capacitor, whereupon a sharply defined current pulse is supplied through the primary of the pulse transformer.

The pulse is transformed through the secondary winding TS8 shown in FIG. 7 and is applied as a positive going pulse through a resistor 86 to the base of the Darlington connected pair of transistor amplifiers QC and QD, turning on QC. QC turns on QD to shut off normally conducting switching transistor Q11, which permits condenser 92 to charge from B+ through resistor 88 and diode D$x$. When the voltage on 92 reaches a potential sufficient to turn on uni-junction QF, a pulse is discharged through the primary winding T2P of pulse transformer T2, whose secondary is connected across the gate and cathode elements of SCR2 in FIG. 6 corresponding to component 38 of FIG. 1. SCR2 is thus fired and discharges the energy stored in capacitor C1 through the impedance comparator 20, which includes the probe coils 10 and 12 contained in a pair of serially connected arms of a Wheatstone form of impedance bridge.

Connected to one side of the primary winding of the above-mentioned pulse transformer T2P is a pair of additional diodes D$y$ and D$z$ poled as shown and providing a positive pulse and a negative pulse therefrom. The negative pulse results from a discharge of uni-junction QF, but the positive pulse results from the ringing of the primary T2P of the pulse transformer T2. The negative pulse is applied through diode D$y$ to the base of normally conducting switching transistor Q5 to shut it off momentarily. Shutting off Q5 raises the potential on the gate elements of SCR device Q7 and triggers it on to drop the potential on the gate of element of SCR Q10.

The aforementioned positive pulse developed from the ringing of transformer T2P in the uni-junction oscillator circuit containing QF is applied through diode D$z$ and line LL to the base of normally non-conducting transistor Q6, which is turned on thereby. When Q6 is turned on, it causes the potential previously developed on now charged condenser 98 to discharge and to apply a negative pulse to the anode of SCR Q10, thereby commutating Q10 and turning it off.

At this point Q10 is off and Q7 is on. The initiation switch may be released, as a hold circuit is established for the initiation circuit, positive potential being applied to the anode of Q7 from the discharge of condenser 100 that was charged from B+ while the initiation switch was closed.

With Q10 off, transistor Q12 will have a positive potential upon its base and will be turned on, thereby shorting condenser 72 in the uni-junction oscillator circuit QE and turning it off. Therefore, SCR1 is turned off, because it is no longer continuously gated. With SCR1 turned off, the capacitor C1 is disconnected from the power source 28 and can no longer be charged. Subsequently with the discharge of C1, SCR2 will also turn off when all the energy stored in C1 has been discharged.

The discharge of the main energy storage capacitor C1 by the firing of SCR2, causes a voltage to develop across probe coils 10 and 12, the inductance and resistance of each of which are shown as separated lumped elements in the illustrated bridge circuit. By choosing the values of the adjustable inductances and resistances LA and RA and LB and RB in the balancing arms of the bridge so that the "Q" of the LA, RA combination and the LB, RB combination are the same as that of their parallel coils, the bridge can be precisely balanced to a fine degree.

The bridge is initially balanced with both coils in air; that is, with neither coil in contact with any metallic surface. The bridge is initially adjusted so no signal will be detected or developed across the bridge output terminals, which are labelled as points G and P of which point G is connected to ground potential. Point P is connected to the input of the amplifier 40 which is a field effect transistor (FET) amplifier having a very high input impedance so as not to draw any current from the bridge that otherwise would affect the sensitivity and accuracy thereof. The coils are then placed over a homogenous piece of ferromagnetic material of uniform permeability, conductivity and consistency characteristics. Again, no signal should be developed across the bridge. In view of the slight differences in the inductances of the coils due to the eddy currents induced in the material, it may be necessary to rebalance the bridge by adjustment of the elements LA or RA or LB or RB to obtain a null or zero output.

The coils are now held adjacent to the ferromagnetic materials containing the comparison weld K and the test weld X. The discharge of C1 produces a high intensity current pulse through the serially connected probe coils 10, 12. The current is of sufficient intensity to create a field of sufficient strength to saturate the workpieces and force eddy currents to flow deep into the workpieces. The rate at which the eddy currents penetrate the weldments can be readout by the measurement of the variation in the dynamic impedances of the coils 10 and 12 as a function of the voltages across the coils during the period of the discharge of the capacitor.

Any signal developed across points G and P is then applied to and detected by the amplifier 40, which is commercially available in integrated circuit form and includes a standard operational amplifier having a sufficient amount of negative feedback for limiting its gain to a very low output value.

The output of the amplifier is applied through an 1800 pico-farad capacitor 42 shown in FIG. 8, which acts as a high pass filter. The filter effectively rejects frequencies corresponding to and below that of the "carrier" and passes only those components of the sensed signal corresponding in frequency to the variations of the difference in the instantaneous amplitudes of the voltages across the test and comparison probe coils.

From the high pass filter, the filtered signal is applied through a pair of common emitter connected transistor amplifiers including transistor amplifier Q13 whose output is supplied through coupling capacitor 102 and an adjustable potentiometer 104 to the input of transistor amplifier Q14.

The output of transistor Q14 is connected to the collector of a normally conducting switching transistor Q15, which corresponds to the blanking gate component 46 of FIG. 1, and effectively shorts the signal at the collector of transistor Q14 to ground. In order to pass the information bearing signal from Q14, transistor Q15 must be turned off. This is accomplished by means of the time delay or unblanking control circuitry corresponding to functional component 48 of FIG. 1.

The unblanking control circuitry is illustrated in FIG. 8 and is activated by a pulse developed across the secondary winding T4S of pulse transformer T4 by a pulse that is applied to its primary T4P shown in FIG. 6 with the commencement of the initiation of the discharge of the main discharge capacitor C1. The secondary of transformer T4 supplies a negative going pulse through resistor 108 and diode D$u$ having a capacitor 110 and Zener diode 12Z connected to the anode thereof as shown. The rise of the voltage across the capacitor 110 is limited by Zener diode 12Z, whose anode is also connected to one side of a 2500 ohm adjustable potentiometer 114, the other side of which is connected to the anode of another Zener diode 116 and to one side of a capacitor 118 as shown. By adjustment of the potentiometer 114, the time at which the voltage is able to rise across the Zener 116 is delayed for a period of several microseconds upon expiration of which the current going down through resistor 120 is negative and shuts off transistor gate Q15. The signal handling or transmission circuit is therefore unblanked or opened to permit the still remaining major portion of the derived signal to be applied now from the collector of transistor Q14 through resistor 122 to the base of transistor Q16, which is connected as a common emitter amplifier. The collector of Q16 is directly coupled to the base of another common emitter transistor Q17 whose collector is connected to terminal point $\alpha$.

From point $\alpha$ the unblanked signal is applied through diode D9 in FIG. 9 through emitter follower connected transistor Q1 to transistor amplifier Q2 whose collector is connected through coupling capacitor 124 and voltage divider network composed of resistor 126 and adjustable potentiometer PL. Potentiometer PL effectively sets the threshold or operating level of the transistor Q3 whose output is connected to the information readout utilization device.

By adjusting potentiometer PL, the level at which Q3 will just go on with any particular value of signal will be the threshold level of the system. If the signal is high enough to actuate Q3, SCR Q8 is gated on and turns on the right-hand indicating lamp marked RH. As Q8 is a conduction latching device, the lamp will remain lit after the disappearance of the signal which turned it on.

The sequence completion readout display 58 is also shown in FIG. 8 and is activated from the pulse induced in transformer T4P of FIG. 6 upon the commencement of the discharge of the main storage capacitor C1. The transformed pulse is supplied from the secondary T4S shown in FIG. 8 and is applied through resistors 108 and 132 to point F connected to similarly labelled input point F in FIG. 9. The pulse is applied through transistor amplifiers QA and QB of which the collector of QB is connected through resistor 134 to the gate element of SCR device Q9. The latter device is included in the current controlling circuit of the left hand indicating lamp, LH, which is turned on if the system has completed its sequence of charging the capacitor and discharging through the probe coils. As Q9 is also a conduction latching device, it remains set after the applied gating pulse has disappeared, and, like Q8 of the right hand or signal comparison readout display, provides a memory storage type of readout.

The readout devices are reset to turn off the indicating lamps when the initiation switch 32 is operated to initiate a subsequent test cycle. Upon the actuation of the switch, transistor Q4 in FIG. 7 is turned on permitting capacitor 136 to discharge and apply a negative pulse through terminal point Z, which is connected to similarly labelled point Z of FIG. 9. The pulse turns off NPN switching transistor QE for a momentary period of time sufficient to interrupt the current through the SCR devices to turn them off, thereby resetting the system for a subsequent test operation.

I claim:

1. A weld analyzer apparatus providing a comparative evaluation of the strength and quality of resistance type welds formed in ferro-magnetic weldment materials and comprising means for generating and applying to one surface of a test weldment and to one surface of a reference standard weldment a pair of pulsed, electro-magnetic fields each of an intensity saturating the ferro-magnetic weldment material to penetrate below the surface of its respective weldment and into the region of the weld contained therein, means sensing and comparing the reaction upon each of the applied fields of the eddy currents induced thereby at different field penetration levels as affected by the characteristics of the welds in the respective weldments and producing a detected output signal therefrom having a parameter that varies in magnitude in accordance with any difference in the characteristics of the welds at the different levels of the penetrating fields therein, high pass filter means connected to receive the detected output of said sensing and comparing means and passing signal frequencies therefrom corresponding to variations in the difference of the sensed reactions of the respective welds on the applied fields and rejecting signal frequencies corresponding to and below that of the pulsed fields applied to the respective weldments, means connected to said filter means and delaying the transmission of signals passed therefrom during the presaturation interval of the fields applied to the test and the reference weldments, and signal utilization means connected to receive and responsive to the amplitude of said delayed signals above a predetermined magnitude, said first mentioned means including a pair of identical probe coils, a stored energy discharge device, and means for discharging a high intensity current pulse therefrom serially through said probe coils each placed in intimate contacting relation with said one surface of a corresponding one of said surfaces and being of a dimension in a direction transverse to the field generated thereby that is less than the longitudinal extent of the fused region of the weld contained in the reference weldment.

2. A weld analyzer apparatus in accordance with claim 1 above wherein said comparing means includes an impedance bridge in which said probe coils are contained in a pair of serially connected arms of the bridge.

3. A weld analyzer apparatus in accordance with claim 2 above wherein the other pair of serially connected arms of said bridge each include an adjustable inductance and resistance having a Q corresponding to that of the probe coil in air in the corresponding opposite arm of the bridge.

4. A weld analyzer apparatus in accordance with claim 3 above wherein the conjugate terminals of the bridge are connected to the input of a high impedance operational amplifier.

5. A weld analyzer apparatus in accordance with claim 4 above wherein the output of the amplifier is connected to said high pass filter.

6. A weld analyzer apparatus in accordance with claim 5 above wherein the output of the filter is coupled to said means delaying the transmission of the detected signal and wherein said means comprises a time delayed unblanking control gate.

7. A weld analyzer apparatus in accordance with claim 6 above wherein the output of the gate is connected through an adjustable threshold level setting device to the signal utilization means.

8. A weld analyzer apparatus in accordance with claim 7 above wherein the signal utilization device is of the stored readout variety that retains the information stored therein upon the activation thereof.

9. A weld analyzer apparatus in accordance with claim 8 above including means for resetting the stored readout utilization device.

10. A weld analyzer apparatus in accordance with claim 1 above wherein said stored energy discharge device is a capacitor.

11. A weld analyzer apparatus in accordance with claim 10 above including a source of power for charging said capacitor, a semi-conductor controlled switch, initiation control means controlling said semi-conductor controlled switch to connect said capacitor in charging circuit relation with said power source, a second semi-conductor controlled switch, and charge level sensing means sensing the level of the charge on the capacitor and controlling said second semi-conductor controlled switch to connect said capacitor in discharge circuit relation with said field generating means and controlling said initiation control means to disconnect the charging of said capacitor from said power source.

References Cited

UNITED STATES PATENTS

| | | | |
|---|---|---|---|
| 3,229,197 | 1/1966 | Renken | 324—40 |
| 3,229,198 | 1/1966 | Libby | 324—40 |
| 3,315,155 | 4/1967 | Colani | 324—40 |
| 3,340,466 | 9/1967 | Ono | 324—40 |
| 3,361,960 | 2/1968 | Renken et al. | 324—40 |

FOREIGN PATENTS

| | | |
|---|---|---|
| 160,855 | 4/1921 | Great Britain. |
| 492,501 | 9/1938 | Great Britain. |

OTHER REFERENCES

Waidelich, D.; Pulsed Eddy Currents Gage Plate Thickness Electronics; November 1955, pp. 146–147.

RUDOLPH V. ROLINEC, Primary Examiner

R. J. CORCORAN, Assistant Examiner